US008453160B2

(12) United States Patent
Sunderland et al.

(10) Patent No.: US 8,453,160 B2
(45) Date of Patent: May 28, 2013

(54) METHODS AND SYSTEMS FOR AUTHORIZING AN EFFECTOR COMMAND IN AN INTEGRATED MODULAR ENVIRONMENT

(75) Inventors: Dean E. Sunderland, Glendale, AZ (US); Terry J. Ahrendt, Mesa, AZ (US); Tim Moore, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 12/721,932

(22) Filed: Mar. 11, 2010

(65) Prior Publication Data
US 2011/0225596 A1 Sep. 15, 2011

(51) Int. Cl.
*G06F 3/00* (2006.01)

(52) U.S. Cl.
USPC .......................................................... 719/312

(58) Field of Classification Search
USPC ................................. 719/310, 312
See application file for complete search history.

(56) References Cited

U.S. PATENT DOCUMENTS

| 6,282,417 | B1 | 8/2001 | Ward |
| 6,353,779 | B1 | 3/2002 | Simon et al. |
| 6,467,003 | B1 | 10/2002 | Doerenberg et al. |
| 6,564,241 | B1 | 5/2003 | Rosengard |
| 6,574,734 | B1 | 6/2003 | Colson et al. |
| 6,664,945 | B1 | 12/2003 | Gyde et al. |
| 7,493,651 | B2 * | 2/2009 | Vanska et al. ........... 726/2 |
| 7,515,974 | B2 | 4/2009 | Black et al. |
| 2002/0009993 | A1 | 1/2002 | Dastrup et al. |
| 2002/0144010 | A1 | 10/2002 | Younis et al. |
| 2006/0107264 | A1 | 5/2006 | Schmidt et al. |
| 2007/0130278 | A1 * | 6/2007 | Baek et al. ........... 709/208 |
| 2007/0164166 | A1 | 7/2007 | Hirvonen |
| 2007/0198110 | A1 * | 8/2007 | Suzuki et al. ........... 700/90 |
| 2008/0163093 | A1 | 7/2008 | Lorido |
| 2009/0019532 | A1 * | 1/2009 | Jacobsen et al. ........... 726/5 |
| 2009/0031115 | A1 | 1/2009 | Pruiett et al. |
| 2009/0062937 | A1 * | 3/2009 | Holstegge et al. ........... 700/79 |
| 2009/0259885 | A1 | 10/2009 | O'Connell et al. |
| 2009/0268753 | A1 | 10/2009 | Lail |
| 2010/0161149 | A1 * | 6/2010 | Nguyen et al. ........... 700/296 |
| 2010/0161606 | A1 * | 6/2010 | Oe et al. ........... 707/736 |
| 2010/0205460 | A1 * | 8/2010 | Lin ........... 713/193 |

FOREIGN PATENT DOCUMENTS

EP 0743580 A1 11/1996

OTHER PUBLICATIONS

Trent R.Jaeger, Leveraging IPSec for Mandatory Access Control of Linuzx Network Communications, Jun. 28, 2005.*
EP Search Report, EP10170987.1-2215 dated Jan. 31, 2011.

* cited by examiner

*Primary Examiner* — Lechi Truong
(74) *Attorney, Agent, or Firm* — Ingrassia Fisher & Lorenz, P.C.

(57) ABSTRACT

Methods and systems are provided for authorizing a command of an integrated modular environment in which a plurality of partitions control actions of a plurality of effectors is provided. A first identifier, a second identifier, and a third identifier are determined. The first identifier identifies a first partition of the plurality of partitions from which the command originated. The second identifier identifies a first effector of the plurality of effectors for which the command is intended. The third identifier identifies a second partition of the plurality of partitions that is responsible for controlling the first effector. The first identifier and the third identifier are compared to determine whether the first partition is the same as the second partition for authorization of the command.

20 Claims, 4 Drawing Sheets

METHODS AND SYSTEMS FOR AUTHORIZING AN EFFECTOR COMMAND IN AN INTEGRATED MODULAR ENVIRONMENT

STATEMENT REGARDING FEDERALLY SPONSORED RESEARCH OR DEVELOPMENT

This invention was made with Government support under Government Contract Number NNJ06TA25C awarded by NASA. The Government has certain rights in this invention.

FIELD OF THE INVENTION

The present invention relates generally to computer systems, and, more particularly, to systems and methods for authorizing effector commands in an integrated modular environment, such as in vehicles.

BACKGROUND

Many systems today perform various functions via computer systems. For example, vehicles (e.g., automobiles, aircraft, and spacecraft) may have various functions provided via processors. In many vehicles or other systems, various functions are provided using separate, individual processors. For example, a flight control system for an airplane may use a first processor or set of processors to send commands to various effectors of the flight control system, while an environmental control system may use a separate processor or set of processors to send commands to various effectors of the environmental control system.

It may be desirable for certain vehicles or other systems to utilize an integrated modular environment for various functions. For example, in an airplane or spacecraft utilizing an integrated modular avionics environment, various functional units (e.g., a flight control system, an environmental control system, and/or various other systems) may utilize a common processor or set of processors to send commands to their respective effectors. Such an integrated modular environment can be advantageous, for example by saving power, weight, space, and/or costs for the vehicle or other system. However, it may be difficult to ensure that transmission of commands from various functions using the common processor or set of processors does not interfere with other functions in such an integrated modular environment, for example by ensuring that the commands of each function do not inadvertently interfere with or control effectors of other functions.

Accordingly, it is desirable to provide an improved system for authorizing commands in an integrated modular environment, such as in a vehicle, for example that prevents commands of one function from inadvertently interfering with or controlling effectors of other functions. It is also desirable to provide an improved method for authorizing commands in an integrated modular environment, such as in a vehicle, for example that prevents commands of one function from inadvertently interfering with or controlling effectors of other functions. Furthermore, the desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment, a method for authorizing a command of an integrated modular environment in which a plurality of partitions control actions of a plurality of effectors is provided. The method comprises the steps of determining a first identifier, determining a second identifier, determining a third identifier using the second identifier, and comparing the first identifier and the third identifier. The first identifier identifies a first partition of the plurality of partitions from which the command originated. The second identifier identifies a first effector of the plurality of effectors for which the command is intended. The third identifier identifies a second partition of the plurality of partitions that is responsible for controlling the first effector. The first identifier and the third identifier are compared to determine whether the first partition is the same as the second partition for authorization of the command.

In accordance with another exemplary embodiment, a system for authorizing a command of an integrated modular environment in which a plurality of partitions control actions of a plurality of effectors is provided. The system comprises a memory and a controller. The memory is configured to store a look-up table. The controller is coupled to the memory, and is configured to determine a first identifier, determine a second identifier, determine a third identifier using the second identifier and the look-up table, and compare the first identifier and the third identifier. The first identifier identifies a first partition of the plurality of partitions from which the command originated. The second identifier identifies a first effector of the plurality of effectors for which the command is intended. The third identifier identifies a second partition of the plurality of partitions that is responsible for controlling the first effector. The first identifier and the third identifier are compared to determine whether the first partition is the same as the second partition for authorization of the command.

In accordance with a further exemplary embodiment, a system for authorizing a command of an integrated modular environment in which a plurality of partitions control actions of a plurality of effectors is provided. The system comprises a receiver and a controller. The receiver is configured to receive a command message comprising the command. The controller is coupled to the receiver, and is configured to determine a first identifier, determine a second identifier using the command message, determine a third identifier using the second identifier, and compare the first identifier and the third identifier. The first identifier identifies a first partition of the plurality of partitions from which the command originated. The second identifier identifies a first effector of the plurality of effectors for which the command is intended. The third identifier identifies a second partition of the plurality of partitions that is responsible for controlling the first effector. The first identifier and the third identifier are compared to determine whether the first partition is the same as the second partition for authorization of the command.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by the preceding background or the following detailed description.

Figure 1:
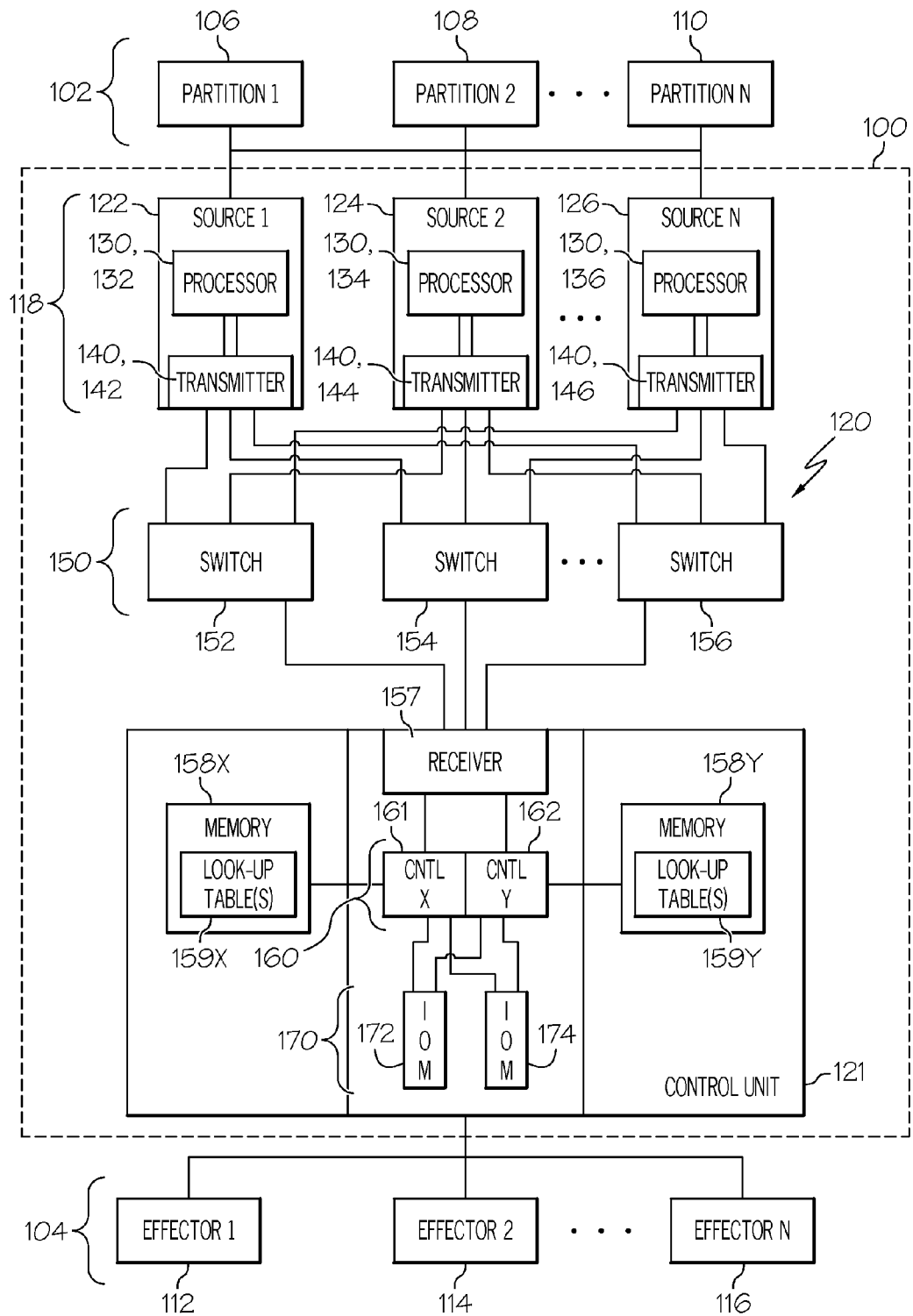
FIG. 1 is a functional block diagram of a command system for transmitting and authorizing commands from a plurality of partitions for controlling a plurality of effectors in an integrated modular environment, for example in spacecraft, in accordance with an exemplary embodiment.

FIG. 1 is a functional block diagram of a command system 100 for transmitting and authorizing commands from a plurality of partitions 102 for controlling a plurality of effectors 104 in an integrated modular environment, in accordance with an exemplary embodiment. The command system 100 preferably includes a computer system, and may be used in spacecraft, aircraft, automobiles, locomotives, marine vehicles, other types of vehicles, and/or any number of other different types of devices and/or systems. In one preferred embodiment, the command system 100 is physically disposed within a housing inside a vehicle, such as a spacecraft, or a system.

Each partition 102 pertains to a particular function or functional unit of the vehicle, device, or system with which the command system 100 is implemented. As depicted in FIG. 1, the partitions 102 may include a first partition 106, a second partition 108, an nth partition 110, and/or any number of other partitions 102. In one preferred embodiment in which the command system 100 is implemented in a spacecraft, each partition 102 pertains to a different functional unit of the spacecraft such as, by way of example only, a flight control functional unit, an environmental control functional unit, and the like.

Each effector 104 represents a device, system, or sub-subsystem of the vehicle, device, or system with which the command system 100 is implemented, and that is controlled by a corresponding partition 102. As depicted in FIG. 1, the effectors 104 may include a first effector 112, a second effector 114, an nth effector 116, and/or any number of other effectors 104. In the above-described embodiment in which the command system 100 is implemented in a spacecraft, each effector 104 comprises a different device, system, or sub-system that is controlled by a corresponding functional unit or partition 102 of the spacecraft. In a preferred embodiment, each effector 104 is controlled by only a single partition 102, but each partition 102 may control multiple effectors 104. For example, (i) the first effector 112 may comprise an environmental control system valve (or an actuator or other control device pertaining thereto) that is controlled by the first partition 106 (which may comprise an environmental control function); (ii) the second effector 114 may comprise an environmental control fan (or an actuator or other control device pertaining thereto) that is also controlled by the first partition 106; (iii) the nth effector 116 may comprise a thruster (or an actuator or other control device pertaining thereto) that is controlled by the second partition 108 (which may comprise a flight control function), and so on.

Each partition 102 provides commands to its one or more respective effectors 104 via the command system 100 to exercise control over such effectors 104. The command system 100 provides cross-checks of the commands and verifies that a partition 102 sending each particular command for an effector 104 is in fact the appropriate partition 102 for controlling that effector 104. The command system 100 transmits the command (or command instructions pertaining thereto) to the effector 104 only if it is determined that the command is authorized and that the command was initiated from the appropriate partition 102 for the given effector 104 for which the command was intended.

The command system 100 includes one or more sources 118, a network 120, and a control unit 121. Each source 118 preferably includes a computer system having a processor 130 and a transmitter 140. As depicted in FIG. 1, the sources 118 may include a first source 122 having a first processor 132 and a first transmitter 142, a second source 124 having a second processor 134 and a second transmitter 144, an nth source 126 having an nth processor 136 and an nth transmitter 146, and/or any number of other sources 118. In one exemplary embodiment, the transmitter 146 is part of and/or coupled to a high integrity network interface card (HNIC).

Each source 118 is configured to process commands that originate from each of the partitions 102, and to transmit command messages accordingly to the control unit 121 along the network 120. Specifically, the respective processors 130 of each of the sources 118 are configured to process redundant versions of each command from each of the partitions 102. For example, in one embodiment, when a partition 102 issues a command for one of the effectors 104, the first processor 132, the second processor 134, and the third processor 136 each process a version of the same command and transmission redundant command messages based upon the command to the control unit 121 via the network 120.

The network 120 supplies the command messages from the sources 118 to the control unit 121. The network 120 includes various switches 150 coupled between the sources 118 and the control unit 121. As depicted in FIG. 1, the switches 150 include a first switch 152, a second switch 154, an nth switch 156, and/or any number of other switches 150. Each switch 150 is preferably coupled to each of the sources 118 and to the control unit 121 via various connections, buses, and/or data links.

The control unit 121 is coupled to the sources 118 via the network 120, and receives the command messages therefrom and determines whether the commands of the command messages are authorized. The control unit 121 is further coupled to the effectors 104, and supplies instructions based on the commands to the effectors 104 provided that the commands are authorized. The control unit 121 determines whether the command are authorized, for example by confirming that the partition 102 initiating the command is in fact the appropriate partition 102 for controlling the effector 104 for which the command is intended.

The control unit 121 includes a receiver 157, a memory 158, one or more controllers 160, and one or more input/output modules 170. The receiver 157 receives the command messages sent from the sources 118 via the network 120. As depicted in FIG. 1, the receive 157 preferably receives the command messages via each of the switches 150 of the network 120. In one exemplary embodiment, the receiver 157 is part of and/or coupled to a high integrity network interface card (HNIC).

The controllers 160 obtain the command messages from the receiver 157 and process the command messages. In the depicted embodiment, the control unit 121 includes a first controller 161 and a second controller 162 for redundant processing of the command messages. In one embodiment, the first controller 161 and the second controller 162 are each hardware controllers forming a self-checking pair. In a preferred embodiment, each of the controllers 161, 162 include a memory 158X and 158Y, respectively, and one or more look-up tables (also referenced herein as command authorization tables) 159X, 159Y, respectively stored therein.

The first controller 161 processes the command messages along a first lane (also referred to as an "X" lane), and the second controller 162 processes the command messages along a second lane (also referred to as a "Y" lane). In so doing, the first and second controllers 161, 162 utilize one or more look-up tables 159 stored in the memory 158 to verify that the partition 102 associated with each command is in fact the partition 102 authorized to control the effector 104 for which the command is intended and to authorize the command.

If it is determined that the partition 102 associated with the command is the partition 102 authorized to control the effector 104 for which the command is intended and the command is authorized, then instructions pertaining to the command are provided to the appropriate effector 104 from the first and second controllers 161, 162 via the input/output modules 170. As depicted in FIG. 1, the control unit 121 may include a first input/output module 172, a second input/output module 174, and any number of other input/output modules 170. Preferably each input/output module 170 includes a transmitter for sending command instructions to the effectors 104.

Figure 2:
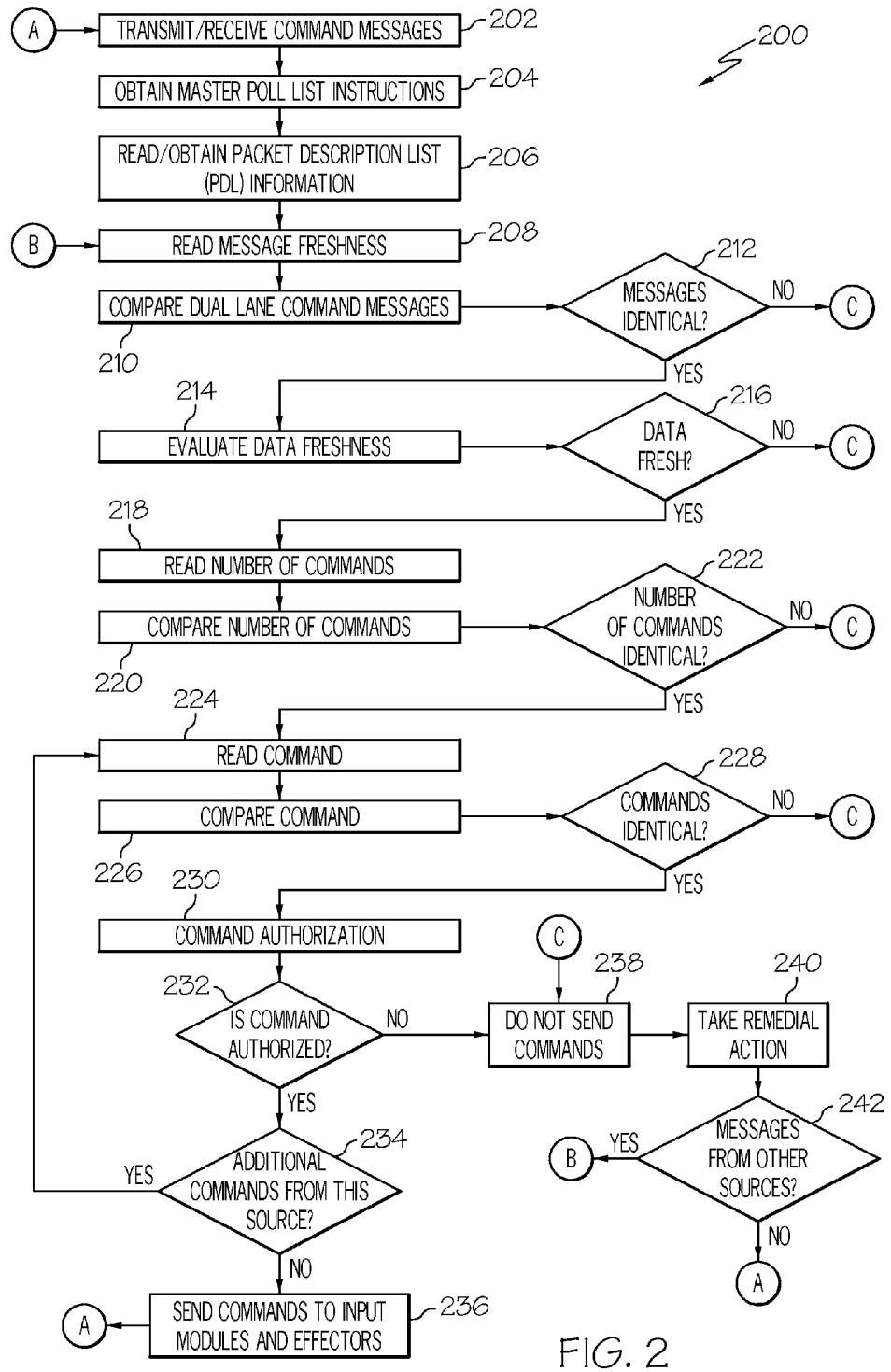
FIG. 2 is a flowchart for a process for transmitting and authorizing commands from a plurality of partitions for controlling a plurality of effectors in an integrated modular environment, for example in spacecraft, and that can be implemented in connection with the command system of FIG. 1, in accordance with an exemplary embodiment.

FIG. 2 is a flowchart for a process 200 for transmitting and authorizing commands from a plurality of partitions for controlling a plurality of effectors in an integrated modular computer environment, for example in spacecraft, in accordance with an exemplary embodiment. The process 200 can be implemented in connection with the command system 100 of FIG. 1, also in accordance with an exemplary embodiment;

In the depicted embodiment, the process 200 begins with the step of transmitting and receiving command messages (step 202). Each command message is preferably transmitted by a transmitter 140 of one of the sources 118 of FIG. 1. The command message is preferably based upon a command initiated from one of the partitions 102 of FIG. 1 intended to control an action of one of the effectors 104 of FIG. 1. In a preferred embodiment, each command message is received by the receiver 157 of the control unit 121 of FIG. 1 from the transmitter 140 of a respective source 118 of FIG. 1 via one of the switches 150 along the network 120. Also, in a preferred embodiment, each command message is received in step 202 by the receiver 157 in dual lanes (preferably a "COM" and a "MON" lane, as is commonly referenced in the industry), thereby resulting in dual lane command messages.

In addition, master poll list instructions are obtained (step 204). In a preferred embodiment, the master poll list (MPL) includes information pertaining to each of the command messages transmitted and received in step 202 in a time partitioned environment. The information includes instructions as to a specific address in a packet description list (PDL) where additional details regarding the command messages can be found. The MPL and the PDL are each preferably stored in memory (such as the memory 158X, 158Y of FIG. 1), and the information and instructions pertaining thereto are obtained, followed, and implemented by a controller (such as the controllers 161, 162 of FIG. 1).

Information from the PDL is then obtained at the address indicated by the MPL instructions for a first command message received in step 202 (step 206). The PDL preferably includes a first identifier of one of the partitions 102 of FIG. 1 from which the command originated. The PDL preferably also includes additional information pertaining to the first command message, such as a number of sources associated with the command and/or the first command message, as well as information and/or a location for command data in the first command message.

Steps 208-242, described below, will be conducted with respect to this first command message in a first iteration of the process. Steps 208-242 are then preferably repeated for other or subsequent command messages in subsequent iterations of the process.

A message freshness is read for the command message (step 208). In a preferred embodiment, the message freshness is read by at least one (most preferably both) of the controllers 161, 162 of FIG. 1.

In addition, dual lane versions of the command message are compared (step 210). In a preferred embodiment, the dual lane versions of the command message are compared by at least one (most preferably both) of the controllers 161, 162 of FIG. 1.

A determination is made as to whether the dual lane command messages are identical (step 212). The determination in step 212 is preferably performed by at least one (most preferably both) of the controllers 161, 162 of the control unit 121 of FIG. 1. If the dual lane command messages are determined to not be identical, then the process proceeds to step 238, described further below.

Conversely, if the dual lane command messages are identical, then a data freshness for the message is evaluated for the command message (step 214), and a determination is made as to whether the data for the command message is fresh (step 216). The evaluation and determination in steps 214 and 216 are preferably performed by at least one (most preferably both) of the controllers 161, 162 of the control unit 121 of FIG. 1. If the data is determined not to be fresh, then the process proceeds to step 238, described further below.

Conversely, if the data is determined to be fresh, then a value pertaining to a number of commands is read from the dual lane versions of the command message (step 218). The number of commands from the dual lane versions of the command message are preferably read by at least one (most preferably both) of the controllers 161, 162 of the control unit 121 of FIG. 1.

The number of commands from the dual lane versions of the command message are then compared (step 220), and a determination is then made as to whether the number of commands in the dual lane versions of the command message are identical (step 222). The comparison and determination in steps 220 and 222 are preferably performed by at least one (most preferably both) of the controllers 161, 162 of the control unit 121 of FIG. 1. If the number of commands in the dual lane versions of the command message are determined to not be identical, then the process proceeds to step 238, described further below.

Conversely, if the number of commands in the dual lane versions of the command message are determined to be identical, then a command is read from the command message (step 224). The command originates from one of the partitions 102 of FIG. 1 from which the command message originated, and pertains to one or more desired instructions for controlling one of the effectors 104 of FIG. 1 for which the command is intended. The command is preferably read by at least one (most preferably both) of the controllers 161, 162 of the control unit 121 of FIG. 1 using the dual lane versions of the command message using instructions provided by the PDL. Preferably, in a first iteration of step 224, a first command is read from the command message. The first command is then compared, authorized, and processed in steps 226-240, described below, in a first iteration. In subsequent iterations of step 224, additional commands are read from the command message. These additional commands are subsequently similarly compared, authorized, and processed in steps 226-240, described below, in subsequent iterations.

The commands from the dual lane versions of the command message are compared (step 226), and a determination is made as to whether the commands are identical (step 228). The comparison and determination in steps 226 and 228 are preferably performed by at least one (most preferably both) of the controllers 161, 162 of the control unit 121 of FIG. 1. If the respective commands from the dual lane versions of the command message are determined to not be identical, then the process proceeds to step 238, described further below.

Conversely, if the respective commands from the dual lane versions of the command message are determined to be identical, then a command authorization is conducted for the command (step 230). During step 230, a determination is made as to whether the command is authorized by at least one (most preferably both) of the controllers 161, 162 of the control unit 121 of FIG. 1, so that only authorized commands will ultimately be provided to the effector 104 of FIG. 1 for which the command was intended.

Figure 3:
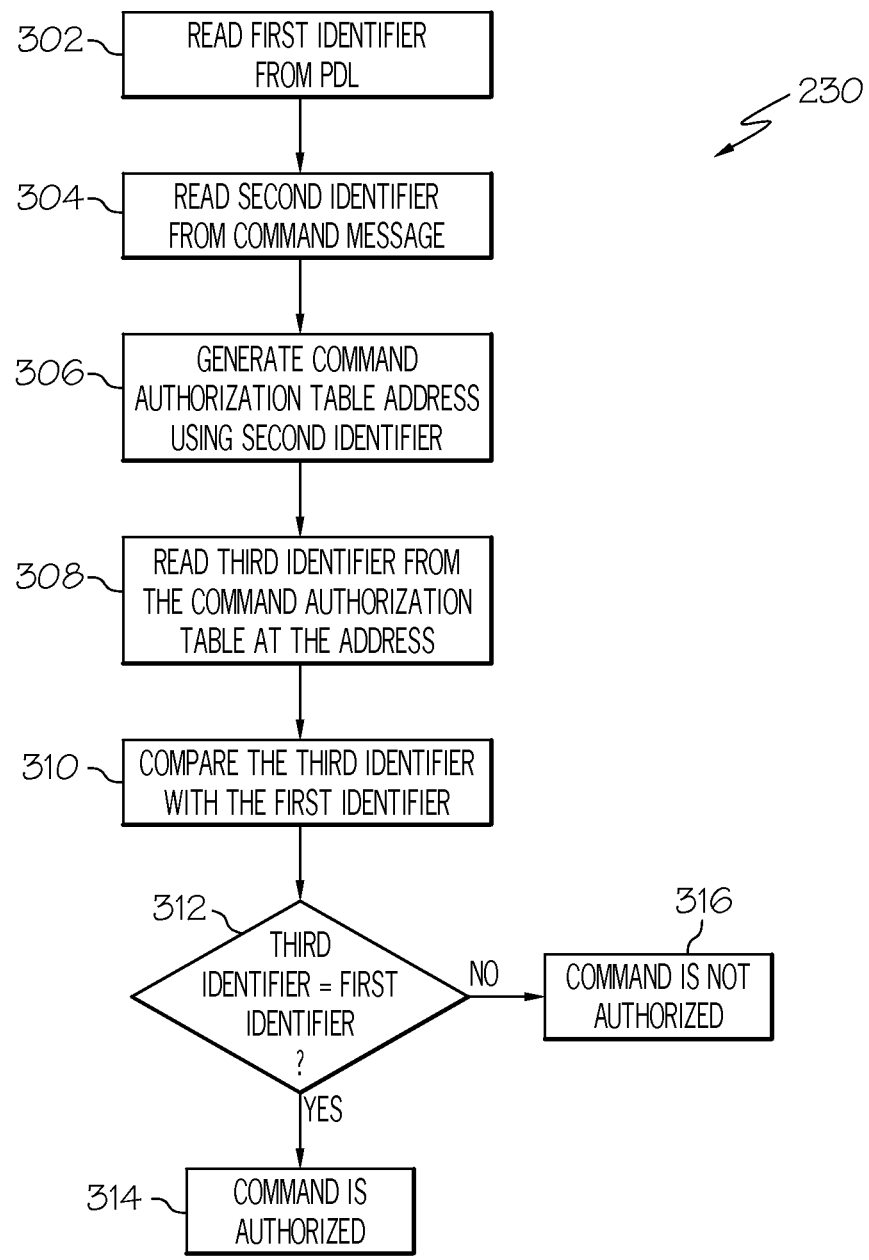
FIG. 3 is a flowchart depicting a sub-process of the process of FIG. 2, specifically, a sub-process of comparing a command message with a redundant command message, in accordance with an exemplary embodiment.
Figure 4:
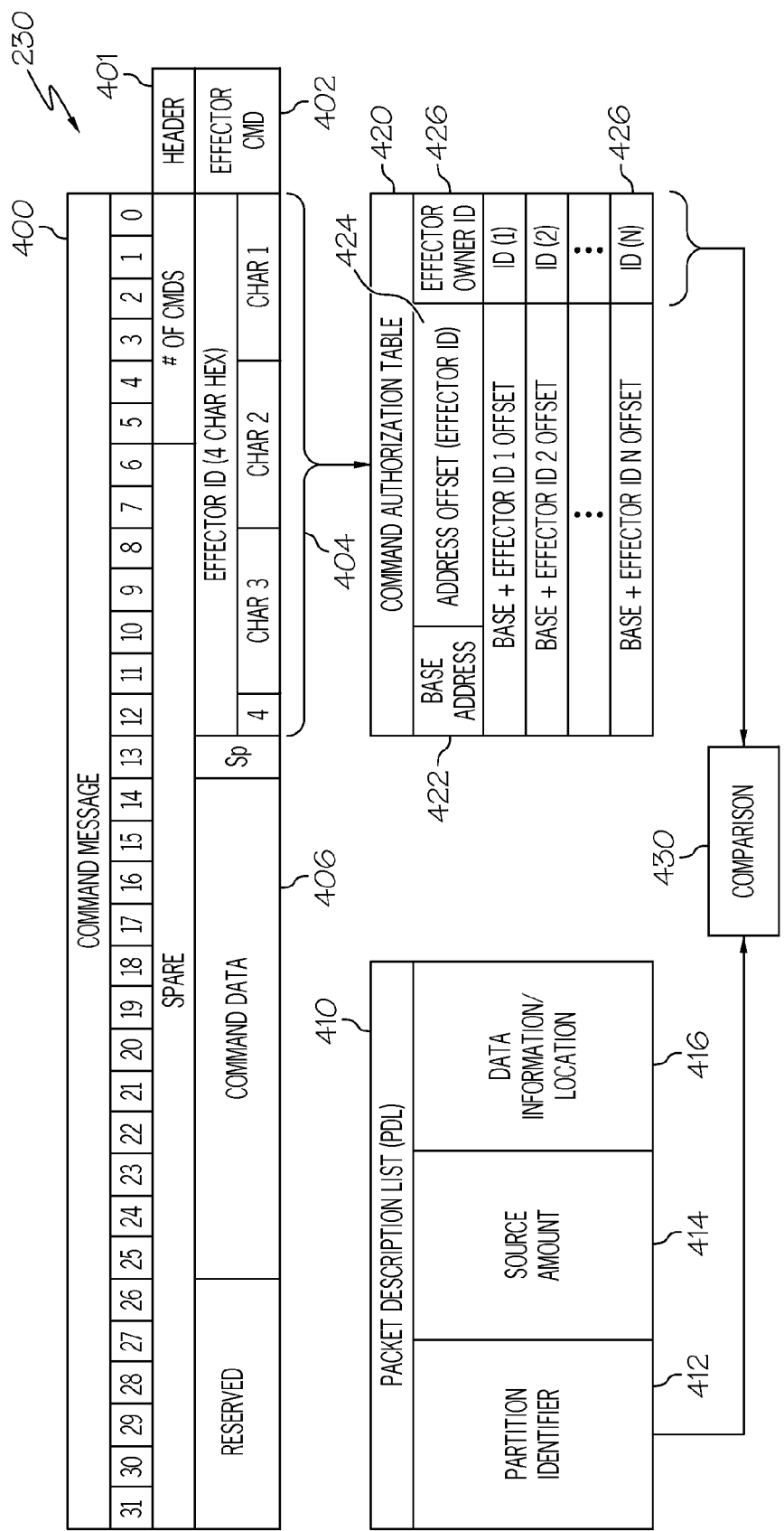
FIG. 4 is a functional block diagram depicting an exemplary functional implementation of the sub-process of FIG. 3 with an exemplary command message, packet description list, and command authorization table, in accordance with an exemplary embodiment.

An embodiment of the command authorization of step 230 is provided in FIGS. 3 and 4. Specifically, FIG. 3 provides a flowchart of various sub-steps of the command authorization of step 230. FIG. 4 provides a simplified block diagram of an exemplary functional implementation of the steps depicted in FIG. 3 and described below with an exemplary command message 400, packet description list (PDL) 410, and command authorization table (420).

As depicted in FIG. 3, a first identifier is read from the packet description list (PDL) referenced above in connection with FIG. 2 (step 302). The first identifier preferably identifies a partition 102 of FIG. 1 from which the command originated.

With reference now to FIG. 4, the first identifier preferably corresponds to the partition identifier 412. As shown in FIG. 4, the first identifier 412 or partition identifier 412 is preferably stored in and read from the PDL 410 by at least one (most preferably both) of the controllers 161, 162 of FIG. 1 from at least one (most preferably both) of the memory 158X and the memory 158Y of FIG. 1 based on instructions provided in the master poll list (MPL) (not depicted in FIG. 4). Also as depicted in FIG. 4, the PDL 410 preferably includes, in addition to the second identifier 412 or partition identifier 412, a source amount 414 identifying a number of sources 118 of FIG. 1 transmitting command messages for the command, and data location and/or information 416 that provides information as to where and how to read command data 406 of the command message 400.

Returning now to FIG. 3, a second identifier is also determined (step 304). The second identifier preferably identifies an effector 104 of FIG. 1 for which the command is intended. As depicted in FIG. 3, the second identifier is preferably read from the command message.

With reference to FIG. 4, the second identifier corresponds to the effector identification (ID) 404 of FIG. 4. As shown in FIG. 4, the second identifier 404 or effector ID 404 is preferably part of the command message 400. The second identifier 404 or effector ID 404 is preferably read from the command message 400 by at least one (most preferably both) of the controllers 161, 162 of FIG. 1 using the data information and/or location 416 provided in the PDL 410. As depicted in FIG. 4, the command message 400 also preferably includes, in addition to the second identifier 404 or partition ID 404, a header 401, an effector command identifier 402, and command data 406 providing instructions pertaining to the command, each of which are also preferably read from the command message 400 by at least one (most preferably both) of the controllers 161, 162 of FIG. 1 using the data information and/or location 416 provided in the PDL 410.

Returning now to FIG. 3, a command authorization table address is generated using the second identifier (step 306). The command authorization table preferably corresponds to the command authorization table 420 of FIG. 4, and is stored in memory, preferably at least one (most preferably both) of the memory 158X and the memory 158Y. The command authorization table address is preferably generated by at least one (preferably both) of the controllers 161, 162 of FIG. 1. In addition, as depicted in FIG. 4, the command authorization table address preferably includes a base address 422 and an address offset 424. The command authorization table 420 preferably includes a unique address offset 424 for each effector 104 of FIG. 1 that can be utilized to identify the partition 102 of FIG. 1 that should be responsible for the command for controlling the particular effector 104 that is the intended recipient of the command.

A third identifier is then determined from the command authorization table at the address generated in step 306 described above (step 308). The third identifier represents the identity of the partition 102 of FIG. 1 that is responsible for and allowed to exercise control over the effector 104 represented by the second identifier of step 304. Specifically, with reference to FIG. 4, the third identifier corresponds to the effector owner identification (ID) 426 as determined from the command authorization table 420. Specifically, in the embodiment depicted in FIG. 4, the third identifier 426 or effector owner ID 426 is read from the command authorization table 420 at the address (namely, the base address 422 and address offset 424) generated in step 306. The third identifier 426 or effector owner ID 426 is preferably read therefrom and determined by at least one (most preferably both) of the controllers 161, 162 of FIG. 2.

The third and first identifiers are then compared (step 310), and a determination is made as to whether the third identifier of step 310 is the same as the first identifier of step 302 (step 312). The comparison/determination is preferably performed by at least one (most preferably both) of the controllers 161, 162 of the control unit 121 of FIG. 1. With reference to FIG. 4, the comparison is also represented by the comparison 430 of the partition identifier 412 (i.e., the first identifier, as read form the PDL 410) with the effector owner ID 426 (i.e., the effector owner ID 426, as read from the command authorization table 420).

If the third identifier is determined to be the same as the first identifier, then the command is determined to be authorized (step 314), as the partition is appropriately exercising control over an effector for which it holds responsibility. Conversely, if the third identifier and the first identifier are not equal to one another, then the command is determined to be unauthorized (step 316), as the partition issuing the command is inappropriately attempting to exercise control over an effector for which it does not hold responsibility.

Returning now to FIG. 2, the process 200 continues with a determination as to whether the command is authorized (step 232). Preferably, the determination of step 232 is based on the determination of steps 302-314 of FIG. 3 as described above. The determination in step 232 is preferably performed by at least one (most preferably both) of the controllers 161, 162 of FIG. 1. 162 of the control unit 121 of FIG. 1. If it is determined that the command is not authorized, then the process proceeds to step 238, described further below.

If it is determined that the command is authorized, then a determination is then made as to whether there are additional commands from the same sources of step 202 (step 234). In a preferred embodiment, step 234 comprises a determination as to whether there are any additional commands in the command message that has been the subject of steps 202-232. This determination is also preferably made by one of the controllers 160 of FIG. 1.

If it is determined in step 234 that there are additional commands from the same source (i.e., from the same command message, in a preferred embodiment), then the process returns to step 224, as a new command is read from the same source (and from the same command message, in a preferred embodiment) in a new iteration of step 224. Steps 224-234 then repeat using the newly read command in the new iteration of step 224 until there is a determination in a subsequent iteration of step 234 that there are no additional commands from the same source (i.e., from the same command message, in a preferred embodiment).

Conversely, once it is determined in an iteration of step 234 that there are no additional commands from the same source (i.e., from the same command message, in a preferred embodiment), and if all of the commands from the same source (i.e., from the same command message, in a preferred embodiment) have been authorized in respective iterations of step 232, then all commands from this source (i.e., from this command message) are sent to one or more of the input/output modules 170 of FIG. 1 for delivery to and implementation by the effector 104 of FIG. 1 for which the command was intended (step 236). In a preferred embodiment, the commands are sent in this manner based on instructions or commands provided by one or both of the controllers 161, 162 of FIG. 1.

Returning now to step 232, if it is determined that any of the commands from the source (i.e. from the command message, in one preferred embodiment), then the process proceed to the above-referenced step 238. During step 238, none of the commands from the source (i.e., in a preferred embodiment, from the command message) are transmitted, as there has been a problem or fault identified with this particular source and/or command message. Specifically, one or both of the processors 161, 162 of FIG. 1 preferably provide instructions that these commands not be transmitted.

In addition, remedial action is preferably taken if one or more of the commands are unauthorized (step 240). The remedial action is preferably taken based on instructions or commands provided by one or both of the controllers 161, 162 of FIG. 1. Preferably, the remedial action includes discarding all data and messages from the source that transmitted the command message.

A determination is then made as to whether there are any other command messages pertaining to these commands from another one of the sources 118 of FIG. 1 (step 242). This determination is preferably made by at least one of the controllers 161, 162 of FIG. 1. If a determination is made that there are such messages from at least one other source, then the process returns to step 208, as a message freshness is read for a new such command message from a new source 118 of FIG. 1. Steps 208-242 then repeat with the command message from the new source. Conversely, if it is determined that there are no such messages from at least one other source, then the process proceeds instead to step 202, as steps 202-242 repeat with new command messages involving new commands, for example from new partitions 102 of FIG. 1.

Accordingly, improved systems and methods are provided for transmitting and authorizing comments from partitions to effectors, such as in spacecraft, other vehicles, and/or other devices and/or systems. The improved systems and methods provide authorization to ensure that partition commands will only be supplied to the intended effector if the partition sending the command is authorized to control the intended effector. This in turn allows for integrated modular environments to be used with increased security, thereby reducing the number of processors and associated weight, space, energy, and costs, in various applications.

It will be appreciated that the steps in the various processes depicted in the Figures and/or described above may vary, may be executed simultaneously, and/or may be executed in a different order than depicted in the Figures and/or described above. It will similarly be appreciated that various apparatus, devices, systems, interactions, relationships, management, and/or other features, and/or parts and/or components thereof, may vary from those depicted in the Figures and/or described above. It will also be appreciated that the methods and systems may be implemented in connection with any number of different types of aircraft, spacecraft, other types of vehicles, computers, controllers, control centers, operators, devices, systems, modules, and/or any number of other different types of platforms or implementations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A method for authorizing a command of an integrated modular hardware environment in which a plurality of partitions control actions of a plurality of effectors, the method comprising the steps of:
    retrieving, from a memory of the integrated modular hardware environment, a first identifier identifying a first partition of the plurality of partitions from which the command originated;
    receiving a command message, the command message including the command and a second identifier, the second identifier identifying a first effector of the plurality of effectors for which the command is intended;
    retrieving, from the memory of the integrated modular hardware environment, a third identifier using the received second identifier via a look-up table stored in the memory of the integrated modular hardware environment following the receiving of the command message, the third identifier identifying a second partition of the plurality of partitions that is responsible for controlling the first effector; and
    comparing the first identifier and the third identifier to determine whether the first partition is the same as the second partition for authorization of the command.

2. The method of claim 1, further comprising the step of: transmitting the command to the first effector if the first partition is the same as the second partition.

3. The method of claim 1, further comprising the step of: taking remedial action if the first partition is not the same as the second partition.

4. The method of claim 1, further comprising the step of:
receiving a command message that includes the command and the second identifier, wherein the step of retrieving the third identifier comprises the step of retrieving the third identifier using the second identifier via a look-up table stored in the memory of the integrated modular hardware environment following the receiving of the command message.

5. The method of claim 4, further comprising the step of:
receiving a duplicate copy of the command message;
wherein the method further comprises the step of comparing the command message and the duplicate copy of the command message.

6. The method of claim 4, wherein the step of determining the second identifier comprises the step of identifying the second identifier from the command message.

7. The method of claim 6, wherein the step of determining the third identifier comprises the step of determining the third identifier using the second identifier and the look-up table.

8. The method of claim 7, further comprising the step of determining the first identifier comprises the step of determining the first identifier from a packet description list pertaining to the command message, wherein the packet description list is stored in the memory of the integrated modular hardware environment.

9. A system for authorizing a command in an integrated modular environment in which a plurality of partitions control actions of a plurality of effectors, the system comprising:
a memory configured to store a look-up table; and
a controller coupled to the memory and configured to:
retrieve, from the memory, a first identifier identifying a first partition of the plurality of partitions from which the command originated;
receive a command message that includes the command and a second identifier, the second identifier identifying a first effector of the plurality of effectors for which the command is intended;
determine from the memory a third identifier using the received second identifier and the look-up table, the third identifier identifying a second partition of the plurality of partitions that is responsible for controlling the first effector; and
compare the first identifier and the third identifier to determine whether the first partition is the same as the second partition for authorization of the command.

10. The system of claim 9, wherein the controller is further configured to provide instructions for transmitting the command to the first effector if the first partition is the same as the second partition.

11. The system of claim 9, wherein the controller is further configured to provide instructions for taking remedial action if the first partition is not the same as the second partition.

12. The system of claim 9, wherein the controller is further configured to determine the second identifier from a command message.

13. The system of claim 12, wherein the controller is further configured to compare the command message and a duplicate copy of the command message.

14. The system of claim 12, wherein the controller is further configured to determine the first identifier from a packet description list pertaining to the command message, the packet description list being retrieved by the controller from the memory.

15. A system for authorizing a command in an integrated modular environment in which a plurality of partitions control actions of a plurality of effectors, the system comprising:
a memory;
a receiver configured to receive a command message, the command message comprising the command and a second identifier, the second identifier identifying a first effector of the plurality of effectors for which the command is intended; and
a hardware controller coupled to the receiver and configured to:
retrieve, from the memory, a first identifier identifying a first partition of the plurality of partitions from which the command originated;
retrieve from the memory a third identifier using the received second identifier via a look-up table stored in the memory, the third identifier identifying a second partition of the plurality of partitions that is responsible for controlling the first effector; and
compare the first identifier and the third identifier to determine whether the first partition is the same as the second partition for authorization of the command.

16. The system of claim 15, wherein the hardware controller is further configured to provide instructions for transmitting the command to the first effector if the first partition is the same as the second partition.

17. The system of claim 15, wherein the hardware controller is further configured to provide instructions for taking remedial action if the first partition is not the same as the second partition.

18. The system of claim 15, wherein the hardware controller is further configured to compare the command message and a duplicate copy of the command message.

19. The system of claim 15, wherein the hardware controller is further configured to determine the third identifier using the second identifier and a look-up table stored in the memory.

20. The system of claim 15, wherein the hardware controller is further configured to determine the first identifier from a packet description list pertaining to the command message, wherein the packet description list is stored in the memory.

* * * * *